United States Patent
Shapiro

(10) Patent No.: US 7,199,720 B1
(45) Date of Patent: Apr. 3, 2007

(54) HEARING PROTECTION WARNING DEVICE

(76) Inventor: Michael Shapiro, 621 14th Green, Incline Village, NV (US) 89452

( * ) Notice: Subject to any disclaimer, the term of this patent is extended or adjusted under 35 U.S.C. 154(b) by 41 days.

(21) Appl. No.: 10/994,199

(22) Filed: Nov. 19, 2004

Related U.S. Application Data

(60) Provisional application No. 60/523,603, filed on Nov. 19, 2003.

(51) Int. Cl.
*G08B 23/00* (2006.01)
(52) U.S. Cl. ............... 340/573.1; 340/407.1; 381/57
(58) Field of Classification Search .............. 340/573.1
See application file for complete search history.

(56) References Cited

U.S. PATENT DOCUMENTS

| | | | | |
|---|---|---|---|---|
| 4,003,264 A | * | 1/1977 | Erlandsson et al. | 73/647 |
| 4,277,980 A | * | 7/1981 | Coats et al. | 73/646 |
| 4,509,189 A | * | 4/1985 | Simpson | 381/56 |
| 5,317,273 A | * | 5/1994 | Hanson et al. | 324/616 |
| 5,420,581 A | * | 5/1995 | Peters et al. | 340/573.1 |
| 7,020,508 B2 | * | 3/2006 | Stivoric et al. | 600/390 |

OTHER PUBLICATIONS

"Baby Boomer Hearing Loss", *Help for Hearing Loss*, Hearing Loss Web Resource Directory, [Internet] http://www.hearinglossweb.com/Medical/Causes/nihl/boomer.htm, 3 pages, Apr. 7, 1999, printed Oct. 29, 2003.
"Noise is Difficult to Define", *Help for Hearing Loss*, Hearing Loss Web Resource Directory, [Internet] http://www.hearinglossweb.com/Medical/Causes/nihl/diff.htm, 9 pages, printed Oct. 29, 2003.
"Noise-Induced Hearing Loss Fact Sheet", *Help for Hearing Loss*, Hearing Loss Web Resource Directory, [Internet] http://www.hearinglossweb.com/Medical/Causes/nihl/nihlfs.htm, 3 pages, printed Oct. 29, 2003.
"Scientists try pill to reduce noise-induced hearing loss", Associated Press, 1 page, circa 2003.

* cited by examiner

*Primary Examiner*—Daniel Wu
*Assistant Examiner*—George A. Bugg
(74) *Attorney, Agent, or Firm*—Sierra Patent Group, Ltd.

(57) ABSTRACT

An apparatus for hearing protection comprising: a body having coupling means, said coupling means configured to attach to a body part; a sound sensor disposed in said body, said sound sensor configured to sense ambient sound; a sound processor coupled to said sound sensor, said sound processor configured to receive a sound signal from said sound sensor and generate a sound indicator signal; an indicator coupled to said sound processor and disposed in said body, said indicator configured to indicate sound levels, said indicator including at least one of a visual display and a tactile indicator, wherein said visual display visually indicates levels of sound and said tactile indicator indicates levels of sound through tactile means.

19 Claims, 2 Drawing Sheets

HEARING PROTECTION WARNING DEVICE

CROSS-REFERENCE TO RELATED APPLICATIONS

This application is a United States Non-Provisional Patent Application claiming priority to U.S. Provisional Patent Application Ser. No. 60/523,603 filed Nov. 19, 2003 which is hereby incorporated by reference as if set forth herein.

BACKGROUND

Hearing loss is occurring at greater rates than in the past. An estimated 30 million Americans are thought to be exposed to hazardous levels of sound at work. An even greater number of people are exposed to excessive noise levels in non-work environments. The exposure to excessive noise causes permanent damage to nerve cells within the ear. The person exposed to the damaging noise is not aware of the damage sustained. Damaging noise levels are not sensed in the ear as pain until extremely high noise levels are reached. Most people are not cognizant of noise levels that cause permanent hearing loss. It is often too late to remedy the hearing loss. The damage to the ear is often a cumulative process, occurring as a result of exposure to excessive sound levels over years and decades. According to the U.S. Environmental Protection Agency, regular exposure to sound levels above 85 decibels (roughly the level of sound emitted from a hair dryer, vacuum cleaner, or gasoline powered lawn mower) can begin to damage hearing. The hair cells of the ear that are damaged secondary to the exposure do not regenerate or heal. Thus the hearing loss incurred is permanent. The best medicine to reduce the risk of hearing loss is prevention.

The prior art has many devices that muffle and block unwanted noise from the ear. The devices that produce the high level sound are also equipped with mufflers and means for diverting or reducing sound levels. However, the prior art does not provide a means of warning people of the level of sound ambient to the people.

What is needed in the art is an apparatus that detects sound and warns individuals of the level of sound to protect hearing.

SUMMARY

The disclosed device is directed towards an apparatus for hearing protection comprising a body having coupling means, the coupling means is configured to attach to a body part. A sound sensor is disposed in the body. The sound sensor is configured to sense ambient sound. A sound processor is coupled to the sound sensor, the sound processor is configured to receive a sound signal from the sound sensor and generate a sound indicator signal. An indicator coupled to the sound processor and disposed in the body. The indicator is configured to indicate sound levels. The indicator includes at least one of a visual display and a tactile indicator, wherein the visual display visually indicates levels of sound and the tactile indicator indicates levels of sound through tactile means.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

This disclosure describes an exemplary hearing protection device. The device provides an indication of noise levels. The device includes a sound sensor disposed in a housing. The sound sensor is coupled to an indicator displayed in the housing. The indicator can be visual as well as tactile. The visual indicator can include portions of varying color or symbols that correspond to a sound level. The indicator can indicate levels of sound ranging from safe ambient levels to dangerous levels that can damage hearing. The tactile indicator can include a vibrator that can increase frequency as the sound sensed increases. The housing can be configured for attachment to a wrist or to an arm or other body part that can be worn by a user.

Figure 1:
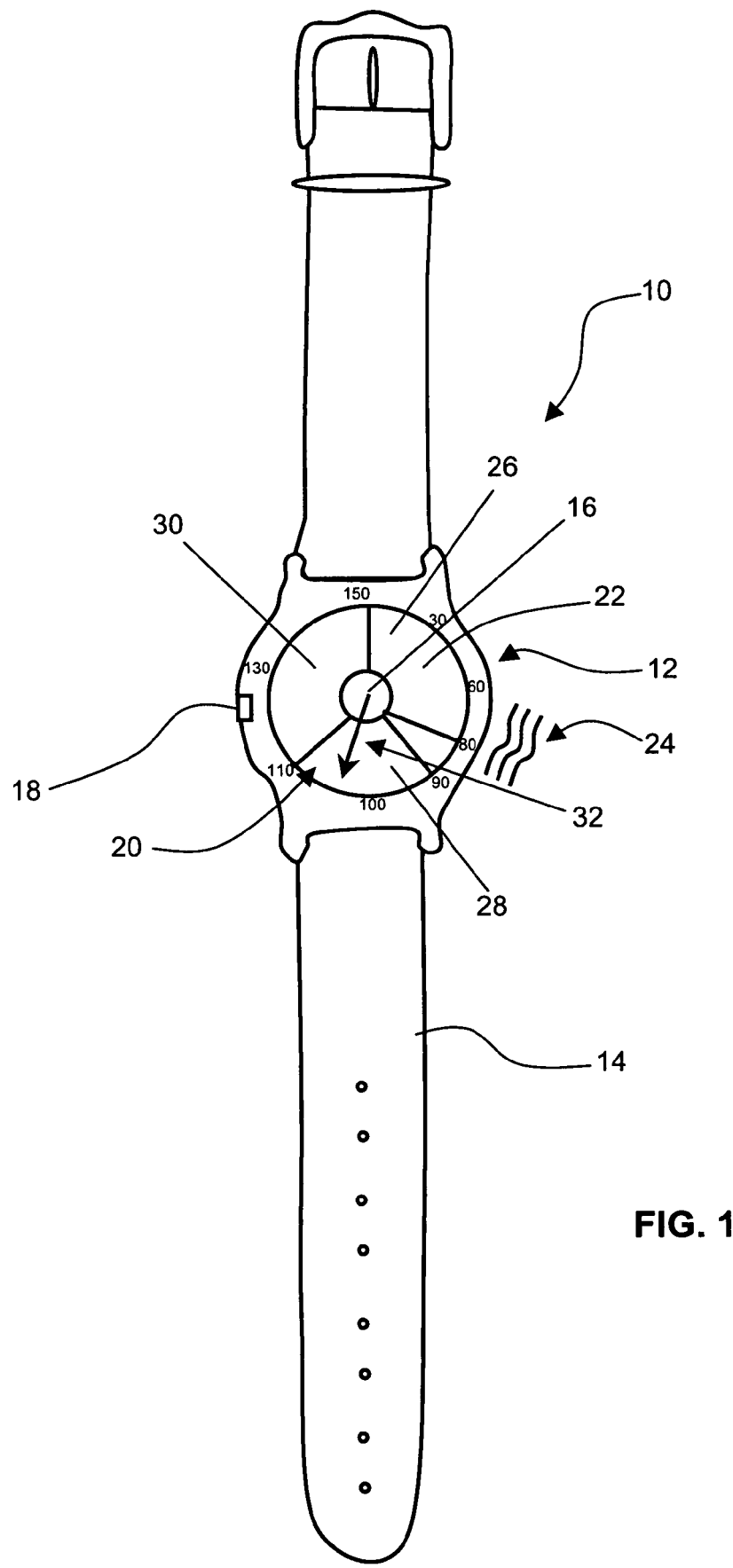
FIG. 1 is a schematic of an exemplary hearing protection device.

Referring to FIG. 1 an exemplary hearing protection device is illustrated. The hearing protection device 10 includes a housing 12 configured for attachment to a body part. The housing 12 can include a band 14 that fits over the wrist or an arm.

A sound sensor 16 is disposed in the housing 12. The sound sensor 16 senses ambient sound. As would be appreciated by one with ordinary skill in the art, the sound sensor 16 may be any device, or combination of devices, that can sense ambient sound and send a sound signal. One example of a sound sensor is a miniature microphone.

Figure 2:
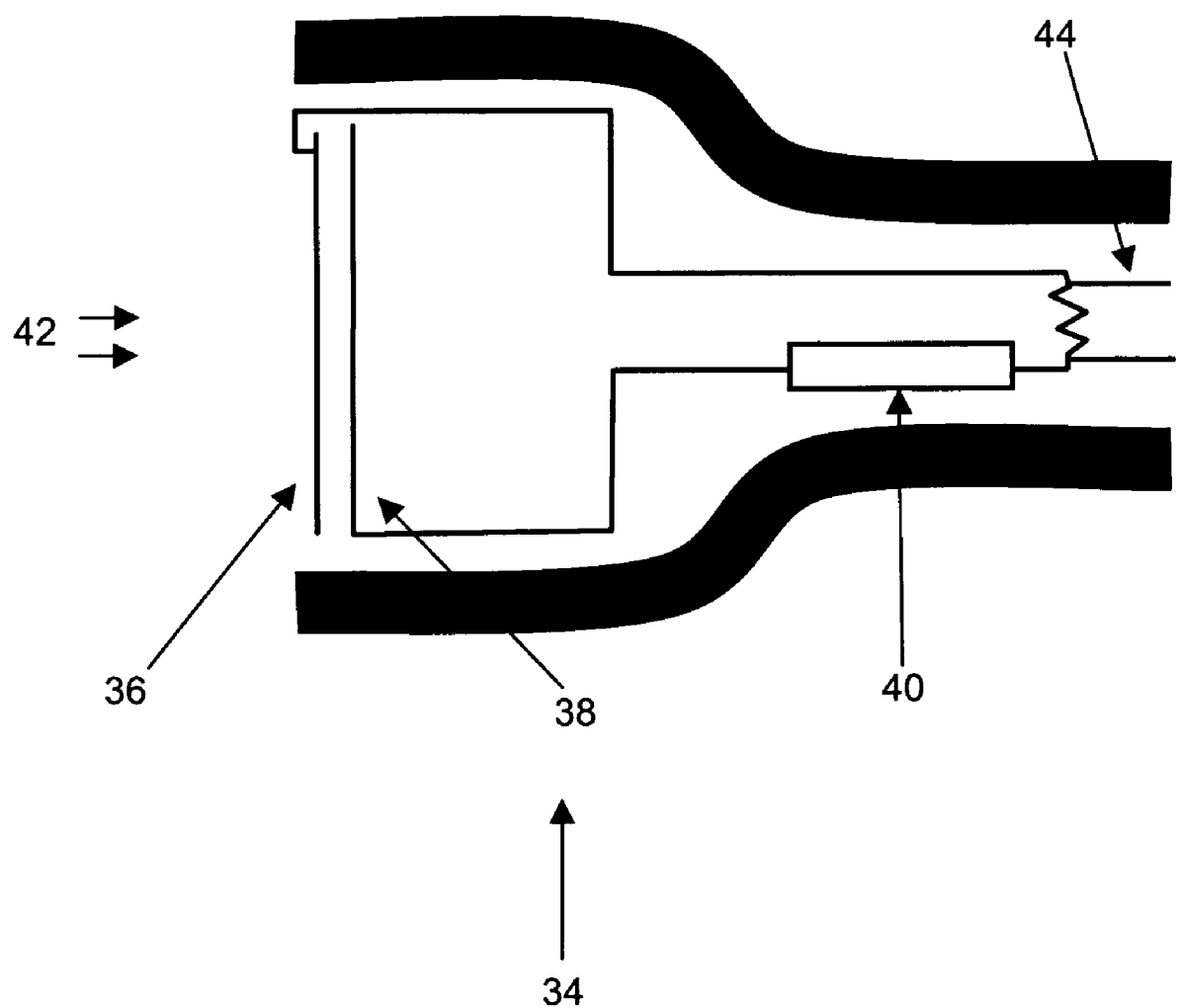
FIG. 2 is one example of a sound sensor known in the art.

FIG. 2 illustrates a microphone 34 known in the art. The microphone 34 comprises a front plate, or diaphragm, 36 and a back plate 38. These plates act as a capacitor when a voltage is provided between them. The voltage may be supplied by a battery 40. When sound waves 42 strike the diaphragm 36, the diaphragm 36 vibrates, changing the distance between the diaphragm 36 and the back plate 38. When the plates are closer together, the capacitance increases and a charge current occurs, resulting in an output sound signal 44. FIG. 2 represents only one example of a sound sensor of the present invention, and is not intended to limit the scope of the invention. Many other forms of sound sensors may be used, including those that do not require a battery 40.

Referring back to FIG. 1, the sound sensor 16 is coupled to a sound processor 18. The sound processor 18 receives the signals sent from the sound sensor 16 and processes the signals. The sound processor 18 generates an indicator output that provides information regarding the level of sound sensed by the sound sensor 16. As would be appreciated by one with ordinary skill in the art, the sound processor 18 may be any device, or combination of devices, that can receive a sound signal from the sound sensor and generate a sound indicator signal. For instance, the sound processor 18 may be an integrated circuit, such as a microprocessor or an amplifier.

An indicator 20 is coupled to the sound processor 18 and receives the indicator output from the sound processor 18. The indicator 20 can include at least one of a visual display 22 and a tactile indicator 24.

The visual display 22 provides visual information regarding the level of sound sensed as well as the severity of the level of sound with respect to the ear and the sense of hearing. A range of noise levels can be included in the visual display 22. The range of noise levels can correspond to decibel levels. The noise levels can be from safe levels 26 to caution levels 28 to danger levels 30. The safe levels 26 can be from about 0 to about 90 decibels. The caution levels 28 can be from about 90 decibels to about 110 decibels. The danger level 30 can be greater than about 110 decibels. Color codes can also be included with the noise levels on the visual display 22. Green can be associated with the safe level 26, yellow associated with the caution level 28 and red can be associated with the danger level 30. The visual display 22 can be analog, such as a conventional meter movement 32, or digital or any combination thereof. Strobe lights, flashing lights and the like can also be included in the visual display 22.

The tactile indicator 24 can include a vibrator that creates a vibration sensation. The tactile indicator 24 can correspond to the noise levels described above. The frequency of the vibration can change as the noise level changes. The vibration can vary from a low frequency at a caution level to a moderate frequency at a caution level to a high frequency at a danger level. Various forms of electric shock can also be included in the tactile indicator 24.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. An apparatus for hearing protection comprising:
    a body having coupling means, said coupling means configured to attach to a body part;
    a sound sensor disposed in said body, said sound sensor configured to sense ambient sound;
    a sound processor coupled to said sound sensor, said sound processor configured to receive a sound signal from said sound sensor and generate a sound indicator signal; and
    an indicator coupled to said sound processor and disposed in said body, said indicator configured to indicate sound levels, said indicator including at least one of a visual display and a tactile indicator, wherein said visual display visually indicates levels of sound, said tactile indicator indicates levels of sound through tactile means, and said sound levels comprise safe levels, caution levels and danger levels.

2. The apparatus of claim 1, wherein said coupling means is a band.

3. The apparatus of claim 1, wherein said body part is a wrist.

4. The apparatus of claim 1, wherein said body part is an arm.

5. The apparatus of claim 1, wherein said indicator indicates sound levels ranging from safe ambient levels to dangerous levels that can damage hearing.

6. The apparatus of claim 1, wherein said visual display comprises portions of varying color that correspond to said sound levels.

7. The apparatus of claim 1, wherein said visual display comprises portions of varying symbols that correspond to said sound levels.

8. The apparatus of claim 1, wherein said visual display corresponds to decibel levels of said sound sensed by said sound sensor.

9. The apparatus of claim 1, wherein said visual display is analog.

10. The apparatus of claim 1, wherein said visual display is digital.

11. The apparatus of claim 1, wherein said visual display is a combination of analog and digital.

12. The apparatus of claim 1, wherein said visual display comprises strobe lights.

13. The apparatus of claim 1, wherein said visual display comprises flashing lights.

14. The apparatus of claim 1, wherein said tactile indicator comprises a vibrator that creates a vibration sensation.

15. The apparatus of claim 14, wherein said vibrator increases the frequency of said vibration sensation as the sound level increases.

16. The apparatus of claim 1, wherein said tactile indicator comprises an electric shock.

17. The apparatus of claim 1, wherein said safe levels are from about 0 to about 90 decibels, said caution levels are from about 90 decibels to 110 decibels, and said danger levels are greater than about 110 decibels.

18. The apparatus of claim 1, wherein said visual display comprises color codes associated with said sound levels.

19. The apparatus of claim 18, wherein said color codes comprise green associated with said safe levels, yellow associated with said caution levels, and red associated with said danger levels.

* * * * *